(12) United States Patent
Beyer et al.

(10) Patent No.: US 7,258,308 B2
(45) Date of Patent: Aug. 21, 2007

(54) METHOD AND APPARATUS FOR CONTROLLING AIRFLOW WITH A GAPPED TRAILING EDGE DEVICE HAVING A FLEXIBLE FLOW SURFACE

(75) Inventors: Kevin W. Beyer, Seattle, WA (US); Stephen J. Fox, Everett, WA (US); Douglas S. Lacy, Bothell, WA (US); Paul T. Meredith, Renton, WA (US); Clayton A. Prow, Everett, WA (US); Seiya Sakurai, Seattle, WA (US); Stephen L. Wells, Bothell, WA (US)

(73) Assignee: The Boeing Company, Chicago, IL (US)

( * ) Notice: Subject to any disclaimer, the term of this patent is extended or adjusted under 35 U.S.C. 154(b) by 59 days.

(21) Appl. No.: 10/188,988

(22) Filed: Jul. 2, 2002

(65) Prior Publication Data
US 2004/0004162 A1 Jan. 8, 2004

(51) Int. Cl.
*B64C 9/16* (2006.01)

(52) U.S. Cl. .................. 244/216; 244/213; 244/215
(58) Field of Classification Search .......... 244/213–219
See application file for complete search history.

(56) References Cited

U.S. PATENT DOCUMENTS

| 1,724,456 A | 8/1929 | Crook |
| 2,444,293 A | 6/1943 | Holt |
| 2,406,475 A | 8/1946 | Rogers |

(Continued)

FOREIGN PATENT DOCUMENTS

| DE | 387 833 | 1/1924 |
| DE | 11 29 379 | 5/1962 |
| EP | 0100775 A1 | 2/1984 |
| EP | 0781704 A1 | 2/1997 |
| EP | 0947421 A1 | 10/1999 |
| FR | 705155 | 6/1931 |
| FR | 984 443 | 7/1951 |
| FR | 56 121 | 9/1952 |
| FR | 57 988 | 9/1953 |
| FR | 58 273 | 11/1953 |
| GB | 1 181 991 | 2/1970 |

OTHER PUBLICATIONS

U.S. patent application Ser. No. 09/714,026, Sakurai, filed Nov. 16, 2000.
U.S. patent application Ser. No. 09/921,212, Farnsworth, filed Aug. 2, 2001.
International Search Report, PCT/US03/19724/ Sep. 11, 2003, 5 pages.
"Flap (aircraft)", Wikipedia, The Free Encyclopedia, Aug. 3, 2006, 10:18 UTC. Wikimedia Foundation, Inc. Aug. 5, 2006; http://wn.wikipedia.org/index.pho!title=Flap%28aircraft%29&oldid=67413665>.
"Slats", Wikipedia, The Free Encyclopedia Jun. 27, 2006, 12:323 UTC. Wikimedia Foundation, Inc. Aug. 5, 2006; http://wn.wikipedia.org/w/index.php!title=Slats&oldid=60827639>.
Leaf Spring Retainer Seals; EMP, Inc.; 2 pgs.

*Primary Examiner*—J. Woodrow Eldred
(74) *Attorney, Agent, or Firm*—Perkins Coie LLP

(57) ABSTRACT

A method and apparatus for controlling airflow with a gapped trailing edge device having a flexible flow surface. The airfoil can include a first portion having a first leading edge, a first flow surface, and a second flow surface facing opposite from the first flow surface. The airfoil can further include a second portion having a second leading edge and a trailing edge, with at least part of the second portion being positioned aft of the first portion. The second portion is moveable relative to the first portion between a first position and a second position, with the second leading edge separated from at least part of the first portion by an airflow gap when the second portion is in the second position. The second portion includes a flexible flow surface that has a first shape when the second portion is in the first position, and has a second shape different than the first shape when the second portion is in the second position.

28 Claims, 6 Drawing Sheets

U.S. PATENT DOCUMENTS

| | | | |
|---|---|---|---|
| 2,504,684 A | 4/1950 | Harper | |
| 2,518,854 A | 8/1950 | Badenoch | |
| 2,851,229 A | 9/1958 | Clark | |
| 2,912,190 A | 11/1959 | MacDonough | |
| 2,920,844 A | 1/1960 | Marshall et al. | |
| 3,112,089 A | 11/1963 | Dornier | |
| 3,375,998 A * | 4/1968 | Alvarez-Calderon | |
| 3,504,870 A | 4/1970 | Cole et al. | |
| 3,539,133 A | 11/1970 | Robertson | |
| 3,556,439 A | 1/1971 | Autry et al. | |
| 3,642,234 A | 2/1972 | Kamber et al. | |
| 3,659,810 A | 5/1972 | Robertson | |
| 3,711,039 A | 1/1973 | James | |
| 3,743,219 A | 7/1973 | Gorges | |
| 3,837,601 A | 9/1974 | Cole | |
| 3,897,029 A | 7/1975 | Calderon | |
| 3,904,152 A | 9/1975 | Hill | |
| 3,910,530 A | 10/1975 | James et al. | |
| 3,917,192 A | 11/1975 | Alvarez-Calderon | |
| 3,941,334 A | 3/1976 | Cole | |
| 3,985,319 A | 10/1976 | Dean et al. | |
| 3,994,451 A | 11/1976 | Cole | |
| 4,015,787 A | 4/1977 | Maieli et al. | |
| 4,106,730 A | 8/1978 | Spitzer et al. | |
| 4,131,253 A | 12/1978 | Zapel | |
| 4,171,787 A | 10/1979 | Zapel | |
| 4,180,222 A | 12/1979 | Thornburg | |
| 4,181,275 A | 1/1980 | Moelter et al. | |
| 4,189,120 A | 2/1980 | Wang | |
| 4,189,121 A | 2/1980 | Harper et al. | |
| 4,202,519 A | 5/1980 | Fletcher | |
| 4,262,868 A | 4/1981 | Dean | |
| 4,293,110 A | 10/1981 | Middleton et al. | |
| 4,312,486 A | 1/1982 | McKinney | |
| 4,351,502 A | 9/1982 | Statkus | |
| 4,360,176 A | 11/1982 | Brown | |
| 4,363,098 A | 12/1982 | Buus et al. | |
| 4,427,168 A | 1/1984 | McKinney et al. | |
| 4,471,927 A * | 9/1984 | Rudolph et al. | 244/215 |
| 4,472,780 A | 9/1984 | Chenoweth et al. | |
| 4,475,702 A | 10/1984 | Cole | |
| 4,479,620 A | 10/1984 | Rogers et al. | |
| 4,528,775 A | 7/1985 | Einarsson | |
| 4,544,117 A | 10/1985 | Schuster | |
| 4,553,722 A * | 11/1985 | Cole | 244/219 |
| 4,575,030 A * | 3/1986 | Gratzer | 244/214 |
| 4,575,099 A | 3/1986 | Nash | |
| 4,650,140 A * | 3/1987 | Cole | 244/214 |
| 4,706,913 A | 11/1987 | Cole | |
| 4,712,752 A | 12/1987 | Victor | |
| 4,789,119 A | 12/1988 | Bellego et al. | |
| 4,796,192 A | 1/1989 | Lewis | |
| 4,823,836 A | 4/1989 | Bachmann et al. | |
| 4,838,503 A | 6/1989 | Williams | |
| 4,962,902 A | 10/1990 | Fortes | |
| 5,050,081 A | 9/1991 | Abbott et al. | |
| 5,056,741 A | 10/1991 | Bliesner et al. | |
| 5,158,252 A | 10/1992 | Sakurai | |
| 5,474,265 A | 12/1995 | Capbern et al. | |
| 5,542,684 A | 8/1996 | Squirrell | |
| 5,544,847 A * | 8/1996 | Bliesner | 244/214 |
| 6,076,776 A * | 6/2000 | Breitbach et al. | 244/219 |
| 6,079,672 A | 6/2000 | Lam et al. | |
| 6,082,679 A | 7/2000 | Crouch et al. | |
| 6,109,567 A * | 8/2000 | Munoz Saiz | 244/215 |
| 6,213,433 B1 * | 4/2001 | Gruensfelder et al. | 244/219 |
| 6,328,265 B1 | 12/2001 | Dizdarevic | |
| 6,382,566 B1 | 5/2002 | Ferrel et al. | |
| 6,443,394 B1 * | 9/2002 | Weisend, Jr. | |
| 6,450,457 B1 | 9/2002 | Sharp | |
| 6,464,175 B2 | 10/2002 | Yada et al. | |
| 6,554,229 B1 * | 4/2003 | Lam et al. | 244/217 |
| 6,601,801 B1 * | 8/2003 | Prow et al. | 244/216 |
| 6,755,375 B2 | 4/2004 | Trikha | |
| 6,824,099 B1 | 11/2004 | Jones | |
| 6,843,452 B1 | 1/2005 | Vassberg et al. | |
| 6,870,490 B2 | 3/2005 | Sherry et al. | |
| 7,028,948 B2 | 4/2006 | Pitt | |
| 7,051,982 B1 | 5/2006 | Johnson | |
| 7,059,563 B2 | 6/2006 | Huynh | |
| 2003/0132860 A1 | 7/2003 | Feyereisen | |
| 2003/0197097 A1 | 10/2003 | Wakayama | |

* cited by examiner

METHOD AND APPARATUS FOR CONTROLLING AIRFLOW WITH A GAPPED TRAILING EDGE DEVICE HAVING A FLEXIBLE FLOW SURFACE

TECHNICAL FIELD

The present application is directed toward methods and apparatuses for controlling the airflow around an airfoil having a gapped trailing edge device with a flexible flow surface.

BACKGROUND

Modern high-speed, subsonic commercial aircraft typically have wings with a variety of leading edge and trailing edge devices to change the shape of the airfoil as the flight conditions change. Such airfoils can include flexible panels at the airfoil leading edge, as disclosed in U.S. Pat. Nos. 3,994,451; 4,171,787; 4,351,502; 4,475,702; and 4,706,913. Other airfoils include flexible trailing edge panels, such as those disclosed in U.S. Pat. Nos. 4,131,253 and 4,312,486.

Other existing devices include variable camber, leading edge Krueger-type flaps, such as those disclosed in U.S. Pat. Nos. 3,504,870; 3,556,439; 3,743,219; 3,910,530; 3,941,334; 4,189,120; 4,189,122; 4,262,868; 4,427,168; 5,158,252; and 5,474,265.

One potential drawback with some of the foregoing devices is that the mechanisms required to actuate the devices can be complex. Accordingly, the cost of installing and maintaining the devices can be relatively high. Another potential drawback is that the devices may not control the airflow over the wing in an optimal manner at all settings. Accordingly, the aerodynamic performance of the airfoils with the leading and/or trailing edge devices deployed may cause some drag increase and corresponding decrease in aircraft performance.

SUMMARY

The present invention is directed toward methods and apparatuses for controlling airflow with a gapped trailing edge device having a flexible flow surface. An airfoil in accordance with one aspect of the invention includes a first portion having a first leading edge, a first flow surface, and a second flow surface facing opposite from the first flow surface. The airfoil can further include a second portion having a second leading edge and a trailing edge with at least part of the second portion being positioned aft of the first portion. The second portion is moveable relative to the first portion between a first position and a second position, wherein the second leading edge is separated from at least part of the first portion by an airflow gap when the second portion is in the second position. The second portion further includes a flexible flow surface having a first shape when the second portion is in the first position and a second shape different than the first shape when the second portion is in the second position. A guide structure is coupled between the first portion and the second portion.

In a further aspect of the invention, the guide structure can include a roller and slot arrangement. In yet a further aspect of the invention, the guide structure can include a four-bar linkage arrangement. For example, the first portion can include a wing body having a hinge support, and the second portion can include a trailing edge body pivotably coupled to the hinge support, and a leading edge body coupled to the trailing edge body with the flexible flow surface. A coupling link can be pivotably coupled between the hinge support and the leading edge body. In another aspect of the invention, the leading edge body can be pivotably coupled to the trailing edge body.

A method in accordance with one aspect of the invention includes varying a geometry of an airfoil having a first portion and a second portion moveably coupled to the first portion. The method can include moving the second portion of the airfoil relative to the first portion of the airfoil from a first position to a second position, with at least part of the second portion being positioned aft of the first portion. The method can further include forming an airflow gap by separating at least part of the second portion from the first portion, and changing the shape of a flexible flow surface of the second portion from a first shape to a second shape different than the first shape as the second portion moves from the first position to the second position.

DETAILED DESCRIPTION

The present disclosure describes airfoils having trailing edge devices with flexible flow surfaces, and methods for operating such airfoils. Many specific details of certain embodiments of the invention are set forth in the following description and FIGS. 1–6C to provide a thorough understanding of these embodiments. One skilled in the art, however, will understand that the present invention may have additional embodiments, and that the invention may be practiced without several of the details described below.

Figure 1:
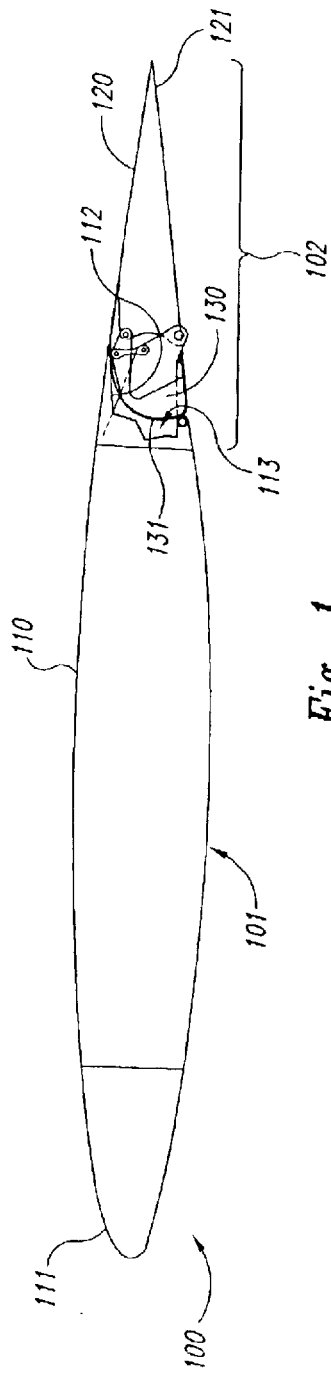
FIG. 1 is a partially schematic, cross-sectional side view of an airfoil having a movable trailing edge portion in accordance with an embodiment of the invention.

FIG. 1 is a partially schematic, cross-sectional side view of an airfoil 100 having a first, fixed portion 101 and a second, movable portion 102 that moves relative to the first portion 101 in accordance with an embodiment of the invention. In one aspect of this embodiment, the first portion 101 can include a wing body 110 having a first leading edge 111 and a first trailing edge 112 that defines an open, aft-facing cove 113. The second portion 102 can include a trailing edge body 120 coupled to a leading edge body 130, both of which extend aft from the wing body 110. The trailing edge body 120 can have a second trailing edge 121 and the leading edge body 130 can have a second leading edge 131 that fits into the cove 113 of the wing body 110. The second portion 102 can move relative to the first portion 101 from a neutral position (shown in FIG. 1) to a variety of deployed positions, as described in greater detail below with reference to FIGS. 2–3B.

Figure 2:
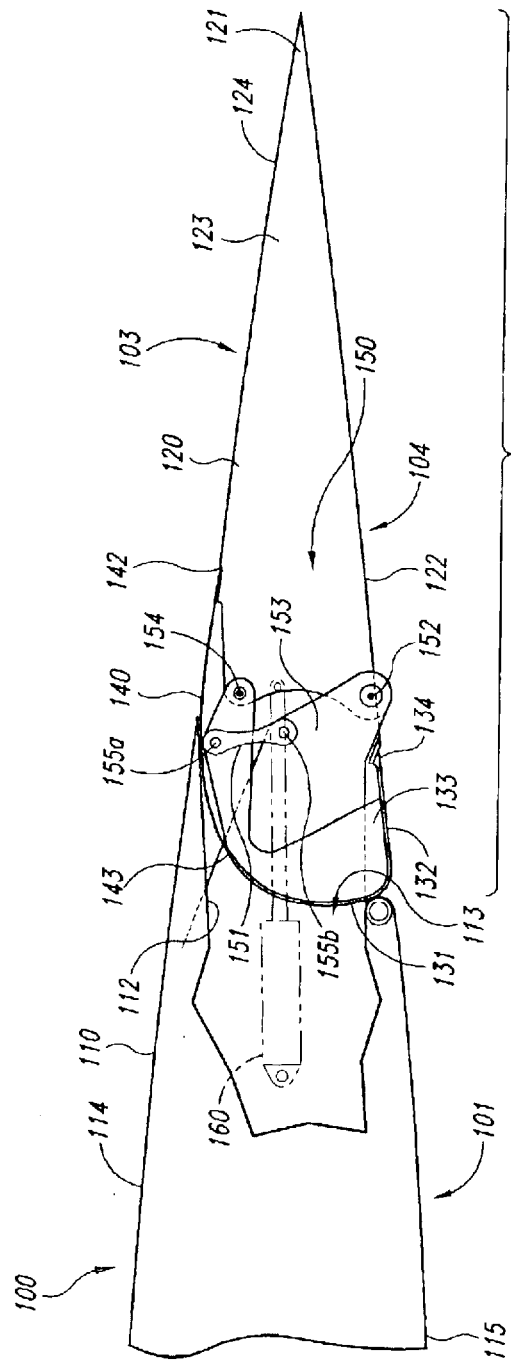
FIG. 2 is an enlarged, partially schematic illustration of an aft part of the airfoil shown in FIG. 1.

FIG. 2 is an enlarged view of the aft portion of the airfoil 100 described above with reference to FIG. 1. As shown in FIG. 2, the first portion 101 can have an upper surface 114 and a lower surface 115 facing opposite from the upper surface 114. The second portion 102 of the airfoil 100 can include an upper surface 103 and a lower surface 104 facing opposite from the upper surface 103. When the second portion 102 is in the neutral position (as shown in FIG. 2), the second portion 102 is at least partially sealed against the first portion 101, with the upper surfaces 114 and 103 forming a generally continuous upper contour, and the lower surfaces 115 and 104 forming a generally continuous lower contour.

In one aspect of an embodiment shown in FIG. 2, the second portion 102 can be coupled to the first portion 101 with a guide structure 150. In a further aspect of this embodiment, the guide structure 150 can include a series of pivots and links arranged to form a four-bar linkage. In other embodiments, the guide structure 150 can have other arrangements, such as a six-bar linkage or a roller/track arrangement. In any of these embodiments, the second portion 102 is at least partially sealed against the first portion 101 when in the neutral position, and can move relative to the first portion 110 to form a gapped trailing edge configuration, as described in greater detail below.

In one embodiment, the wing body 110 can include a hinge support 153 that extends aft from the cove 113. The trailing edge body 120 can be pivotably coupled to the hinge support 153 with a lower pivot joint 152. The trailing edge body 120 can also be pivotably coupled to the leading edge body 130 at an upper pivot joint 154. The leading edge body 130 can be coupled to the hinge support 153 with a coupling link 151 having first and second coupling hinges 155 (shown as coupling hinges 155a and 155b). Accordingly, the coupling link 151 can complete the four-bar linkage arrangement.

A flexible flow surface 140 extends from an aft attachment point 142 on the trailing edge body 120 to a forward attachment point 143 on the leading edge body 130. Accordingly, the flexible flow surface 140 can change shape as the second portion 102 pivots relative to the first portion 101. In one embodiment, the flexible flow surface 140 can include a metal sheet, such as an aluminum sheet or a titanium sheet. In another embodiment, the flexible flow surface 140 can include a composite material, such as a carbon fiber material. In still further embodiments, the flexible flow surface 140 can include other pliable materials that can withstand the aerodynamic loads of high-speed flight. The pivoting action for the four-bar linkage can be provided by an actuator 160 coupled between the wing body 110 and a point on the trailing edge body 120 spaced apart from the lower pivot joint 152. For example, the actuator can include an electric, pneumatic and/or hydraulic device, coupled above the lower pivot joint 152 (as shown in FIG. 2) or below the lower pivot joint 152. In other embodiments, the airfoil 100 can include other actuation arrangements.

In one aspect of an embodiment shown in FIG. 2, the leading edge body 130 can include a series of spanwise, spaced apart flanges 133 covered by a skin 134 that defines a portion of the second leading edge 131. In another embodiment, the leading edge body 130 can include a generally solid element that extends span-wise and defines the second leading edge 131. The trailing edge body 120 can also include a series of spanwise, spaced apart flanges 123 and a skin 124 that covers the flanges 123 to define the upper surface 103, the second trailing edge 121, and an aft segment 122 of the lower surface 104. The leading edge body 130 can include a forward segment 132 of the lower surface 104. The forward segment 132 and the aft segment 122 can form a generally continuous contour when the second portion 102 is in the neutral position, and can be spaced apart from each other when the second portion 102 moves to its deployed positions, as described in greater detail below with reference to FIGS. 3A–3C.

Figure 3A:
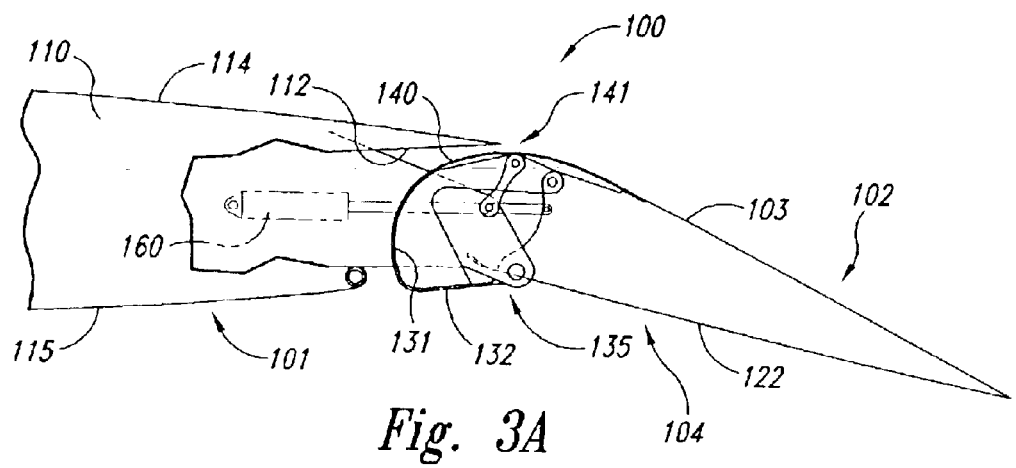
FIGS. 3A–3C illustrate an airfoil having a movable trailing edge device deployed in accordance with embodiments of the invention.

FIG. 3A is a partially schematic, cross-sectional side view of the airfoil 100 with the second portion 102 deflected downwardly by 20° relative to the neutral position shown in FIGS. 1 and 2. As shown in FIG. 3A, deploying the second portion 102 opens a gap 141 between the second leading edge 131 of the leading edge body 130, and the first trailing edge 112 of the wing body 110. Deploying the second portion 102 also opens a space 135 between the aft segment 122 and the forward segment 132 of the lower surface 104. The gap 141 is configured to allow a portion of the flow passing along the lower surface 115 of the wing body 110 to flow through the gap 141 to the upper surface 103 of the second portion 102. The space 135 is configured to have a small and/or negligible impact on the airflow passing along the lower surface 104 of the second portion 102.

Figure 3B:
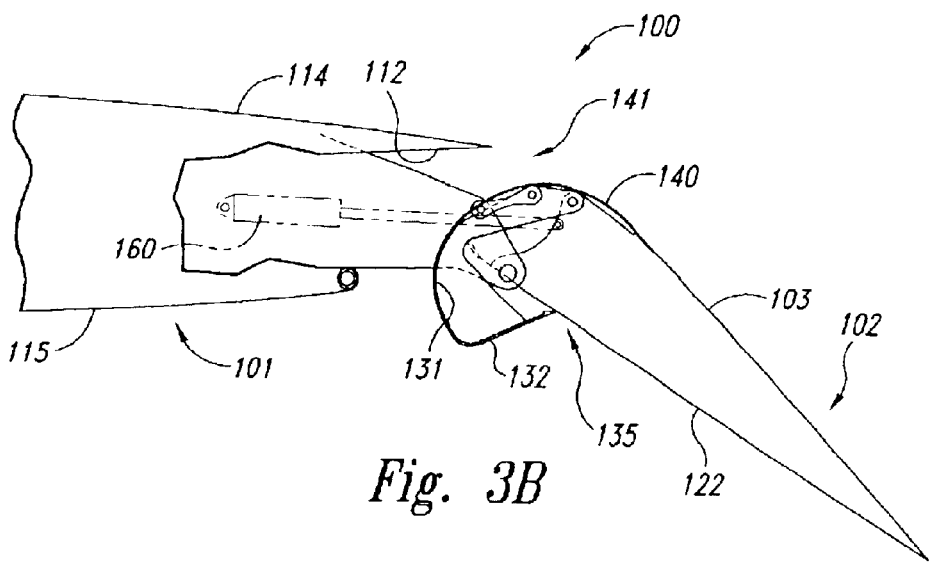

The second portion 102 can be further deployed to additional downwardly deflected positions. For example, as shown in FIG. 3B, the second portion 102 can be deployed to a 40° downwardly deflected position. In other embodiments, the second portion 102 can have other maximum downwardly deflected positions, and in any of these embodiments, the second portion 102 can be deflected to any intermediate position between the neutral or undeflected position (shown in FIGS. 1 and 2) and the maximum downwardly deflected position shown in FIG. 3B. In any of these embodiments, when the second portion 102 is deflected downwardly, it can increase the lift of the airfoil 100. Accordingly, multiple second portions 102 can be deployed symmetrically during take-off and landing, or asymmetrically for roll control, as described in greater detail below with reference to FIGS. 4A–4H.

Figure 3C:
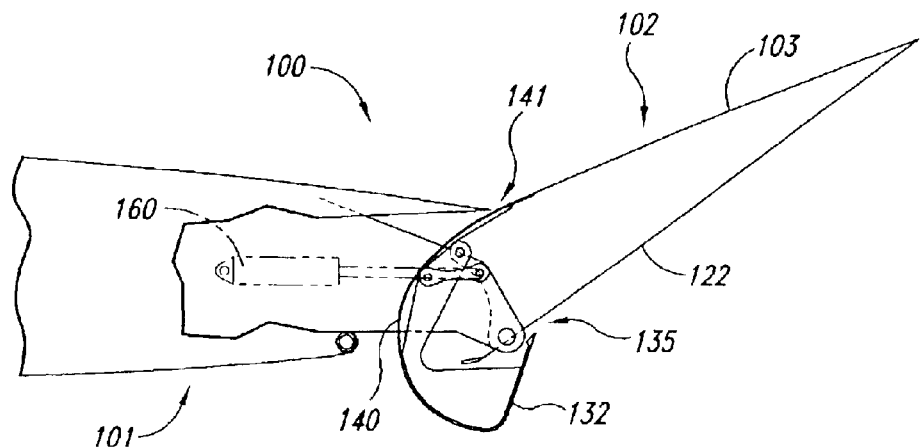

The second portion 102 can also be deployed upwardly from the neutral position, as shown in FIG. 3C. In one aspect of this embodiment, the second portion 102 can be deflected upwardly by up to 30° or more, relative to the first portion 101. Accordingly, the second portion 102 can act as a lift spoiler, for example during landing approach and/or after touchdown.

A further characteristic of the foregoing embodiments is that the flexible flow surface 140 changes shape as the second portion 102 moves relative to the first portion 101. Accordingly, the flexible flow surface 140 can provide a smooth, aerodynamic shape for the second leading edge 131 of the second portion 102, even as the second portion 102 undergoes substantial deflections from its neutral position. The smooth, aerodynamic shape can promote attached airflow over the second portion 102 even at extreme downward deflections.

Figure 4A:
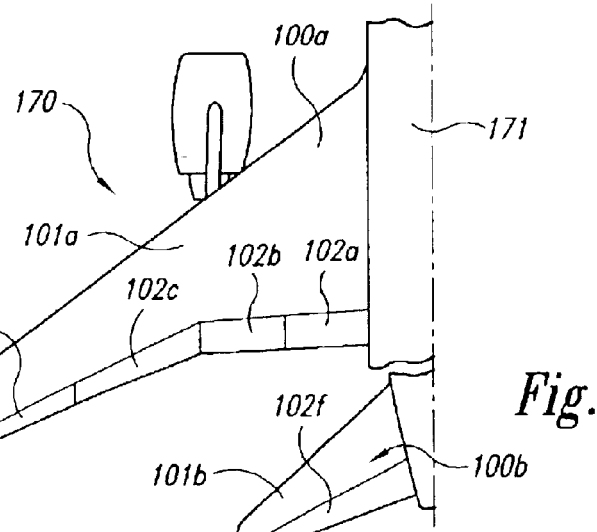
FIGS. 4A–4H schematically illustrate an aircraft having a plurality of movable trailing edge portions, along with settings for the trailing edge portions at a variety of flight conditions.

FIG. 4A is a partially schematic illustration of an aircraft 170 having a plurality of airfoils with first and second portions arranged in a manner generally similar to that described above with reference to FIGS. 1–3C. For example, the aircraft 170 can include a wing airfoil 100a and a horizontal stabilizer airfoil 100b. The wing airfoil 100a can include a first portion 101a fixed to a fuselage 171 of the aircraft 170, and a plurality of second portions 102 (five are shown in FIG. 4A as second portions 102a–102e), all of which are movable relative to the first portion 101a. The horizontal stabilizer 100b can include a first portion 101b and a second portion 102f that is movable relative to the first portion 101b. The second portion 102f can be selectively deployed upwardly and downwardly to control the pitch of the aircraft 170. The second portions 102a–102e can be selectively deployed in a variety of manners corresponding to a variety of flight conditions, as described in greater detail below with reference to FIGS. 4B–4H.

Figure 4B:
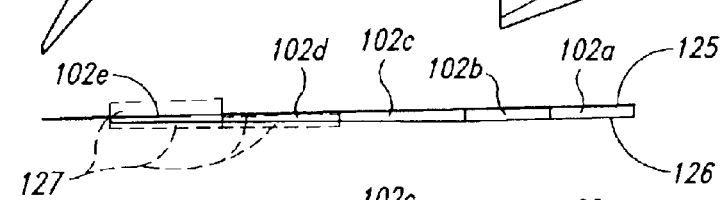
Figure 4C:
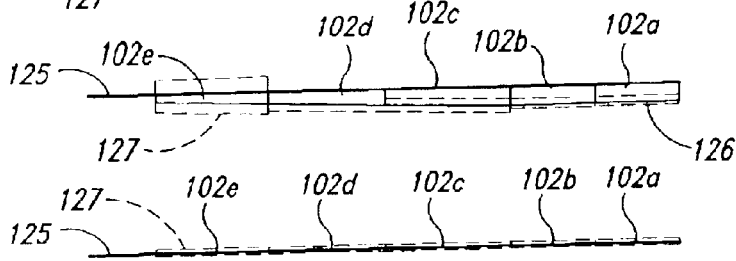
Figure 4D:
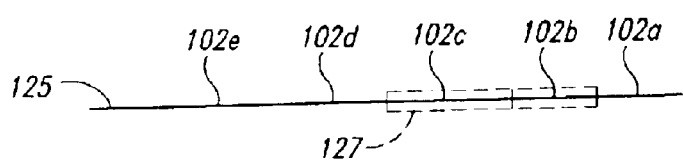
Figure 4E:
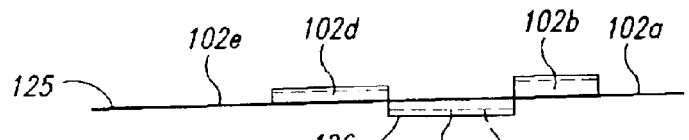

FIGS. 4B–4H are schematic illustrations of the second portions 102a–102e deployed in a variety of combinations depending upon the flight condition of the aircraft 170. In each of FIGS. 4B–4H, line 125 represents the neutral position for each second portion 102, line 126 represents a steady state deflected position for each second portion 102, and phantom lines 127 represent time-varying deflections of the second portions 102. For example, as shown in FIG. 4B (representing a normal take-off configuration), second portions 102a–102e can be deflected downwardly 100 from the neutral position to a steady state position, and then outboard second portions 102d and 102e can be deflected upwardly and downwardly from the 100 position in a time-varying manner to provide for a low speed roll control. For a short take-off (shown in FIG. 4C), the second portions 102a–102e can be deflected downwardly by 20°, with each second portion 102a–102e deflected upwardly or downwardly in a time-varying manner as needed for low speed roll control. In a typical cruise condition (FIG. 4D) all the second portions 102a–102e are moved to the neutral position, with small upward and downward deflections as needed for local trim and/or gust load alleviation. As shown in FIG. 4E, second portions 102b and 102c can be deployed during high speed flight to provide for high speed roll control. Second portions 102b and 102c on opposite sides of the fuselage 171 (FIG. 4A) will be deployed in opposite directions to achieve the required roll moment.

Figure 4F:
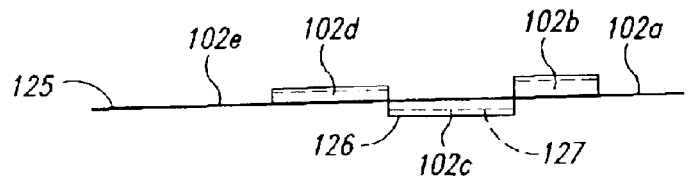
Figure 4G:
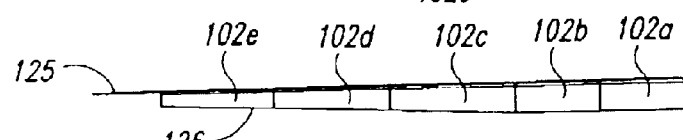
Figure 4H:
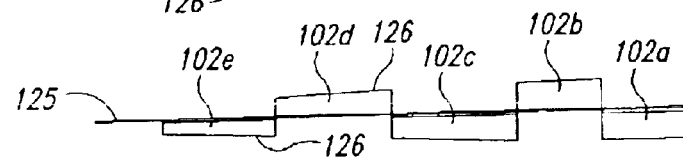

As shown in FIG. 4F, second portions 102b–102d can be deployed in flight to increase the drag of the airfoil 100a, providing an in-flight braking mechanism. As shown in FIG. 4G, all the second portions 102a–102e can be deflected downwardly by 40° during landing. After the aircraft is landed, some or all of the second portions 102a through 102e can be deflected upwardly as shown in FIG. 4H, to spoil the lift of the airfoil 100a.

In other embodiments, the aircraft 170 shown in FIG. 4A can have other combinations of second portions 102, and/or the second portions 102 can be deployed in other manners, depending on flight condition. The airfoils 100a and/or 100b can be installed on aircraft 170 having a typical swept wing, twin engine configuration (as shown in FIG. 4A) or these elements can be installed on any aircraft that benefits from deployable lift control devices.

One feature of embodiments of the airfoils described above with reference to FIGS. 1–4H is that the flexible flow surface 140 can change shape as the second portion 102 deflects relative to the first portion 101. An advantage of this arrangement is that the flow surface defined by the second leading edge 131 and the upper surface 103 can be smooth and continuous, even as the second portion 102 deploys to substantial deflection angles relative to the neutral position, and even as the gap 141 between the second portion 102 and the first portion 101 increases in size. Accordingly, this arrangement can maintain a smooth flow of air over the second portion 102 even at high lift settings.

Another feature of embodiments of the airfoils described above with reference to FIGS. 1–4H is that the guide structure 150 that controls the motion of the second portion 102 can include a relatively simple four-bar linkage arrangement. An advantage of this arrangement is that the four-bar linkage has relatively few moving parts and is accordingly simpler to install and maintain than some conventional arrangements. A further advantage of this arrangement is that the guide structure 150 can be entirely contained or almost entirely contained within the contour defined by the upper and lower surfaces of the first portion 101 and the second portion 102. Accordingly, the need for large, movable fairings (which can significantly increase aircraft drag) can be reduced and/or eliminated.

Figure 5:
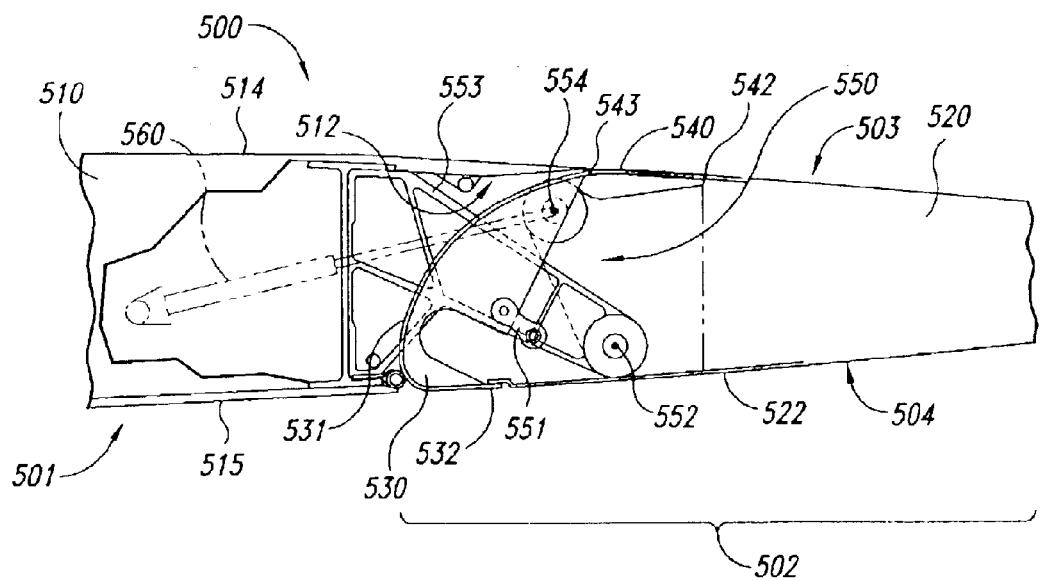
FIG. 5 is a partially schematic, cross-sectional side view of an airfoil having a movable aft portion in accordance with another embodiment of the invention.

In other embodiments, the airfoils can have other arrangements that also include smooth surfaced, gapped deployable trailing edge devices. For example, as shown in FIG. 5, an airfoil 500 can include a first portion 501 coupled to a second portion 502 with a guide structure 550 in accordance with another embodiment of the invention. In one aspect of this embodiment, the first portion 501 can include a wing body 510 having an upper surface 514, a lower surface 515, a first trailing edge 512, and a hinge support 553 that extends aft from the first trailing edge 512. The second portion 502 can include a trailing edge body 520 (a portion of which is visible in FIG. 5) coupled at a lower pivot joint 552 to the hinge support 553. The second portion 502 can further include a leading edge body 530 coupled to the hinge support 553 with a coupling link 551. An actuator 560 can be coupled to the second portion 102 at a pivot point 554 to move the second portion 102 relative to the first portion 101.

Unlike the configuration described above with reference to FIGS. 1–4H, the leading edge body 530 is not pivotably coupled directly to the trailing edge body 520, but is instead linked to the trailing edge body 520 only via a flexible flow surface 540. Accordingly, the flexible flow surface 540 is connected to the trailing edge body 520 at an aft attachment point 542, and is attached to the leading edge body 530 at a forward attachment point 543. The trailing edge body 520 has an upper surface 503 and a lower surface 504 that defines an aft segment 522. The leading edge body 530 has a second leading edge 531 that defines a forward segment 532. The forward segment 532 forms a continuous contour with the aft segment 522 when the second portion 502 is in the neutral position, and breaks with the aft segment 522 when the second portion 502 is deflected, as described in greater detail below with reference to FIGS. 6A–6C.

Figure 6A:
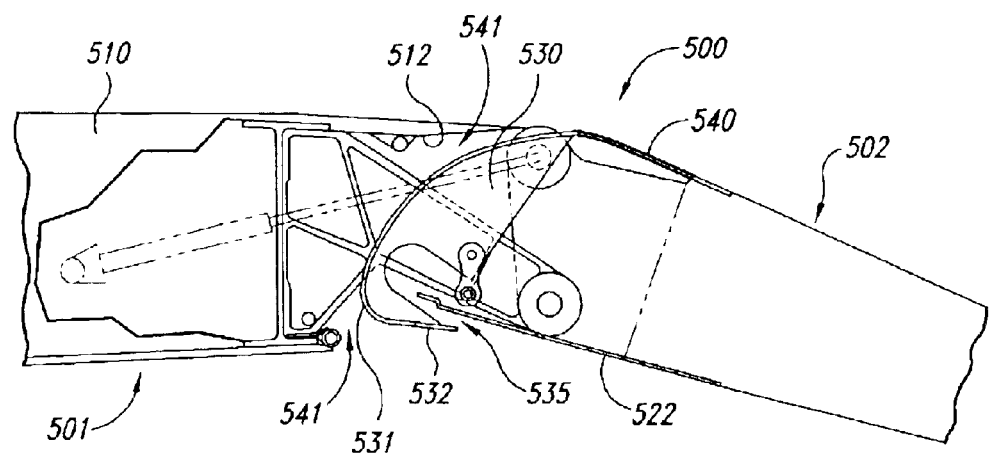
FIGS. 6A–6C illustrate the airfoil shown in FIG. 5 deployed to a variety of positions in accordance with embodiments of the invention.
Figure 6B:
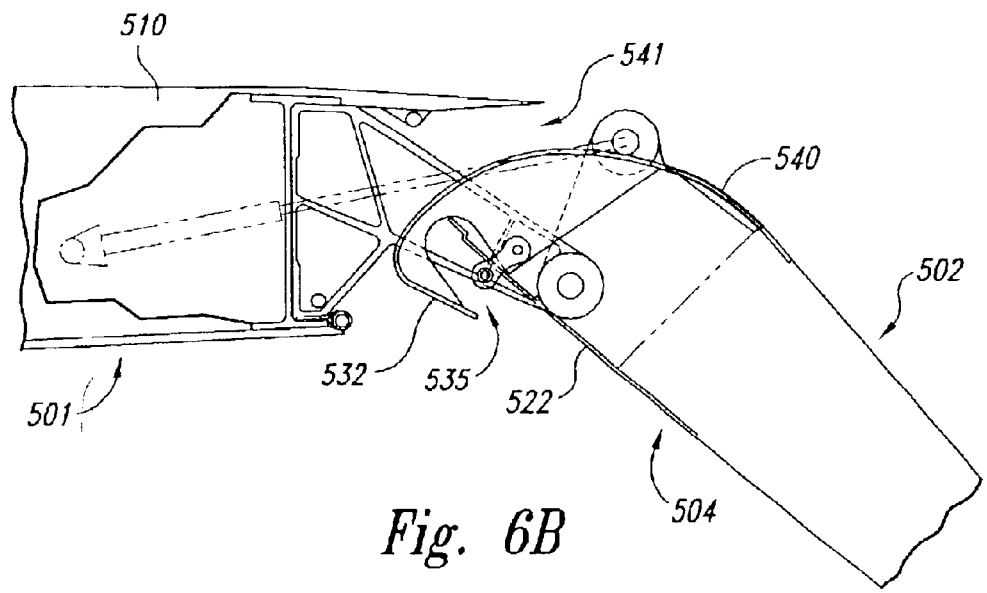
Figure 6C:
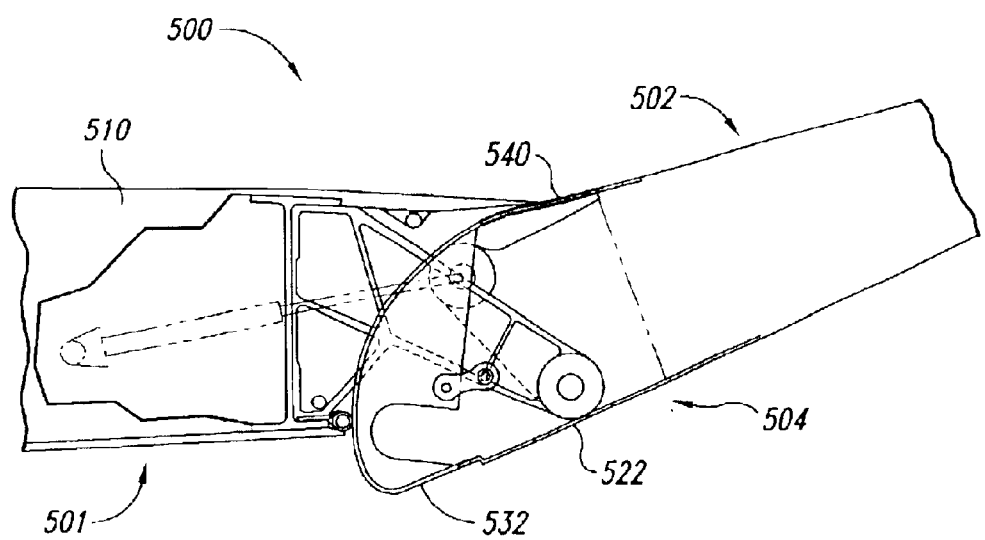

FIGS. 6A–6C illustrate the airfoil 500 with the second portion 502 deflected to a variety of deployed positions in accordance with embodiments of the invention. For example, as shown in FIG. 6A, the second portion 502 can be deflected downwardly 20° from the neutral position to form a gap 541 between the first trailing edge 512 of the wing body 510, and the second leading edge 531 of the leading edge body 530. As the second portion 502 deflects downwardly, the flexible flow surface 540 changes shape to maintain a smooth, continuous flow surface between the leading edge body 530 and the trailing edge body 520. At the same time, a space 535 opens between the aft segment 522 and the forward segment 532.

As shown in FIG. 6B, the second portion 502 can be deflected to a maximum downward deployment of 450 relative to the neutral position in one embodiment. In other embodiments, the second portion 502 can have other maximum downward deflections. In one aspect of this embodiment, the pivot connection between the second portion 502 and the actuator 560 can project above the flexible flow surface 540 as the second portion 502 deflects downwardly. Alternatively, the pivot connection can be positioned to remain below the flexible flow surface 540 as the second portion 502 moves. As shown in FIG. 6C, the second portion 502 can be deflected upwardly to a maximum deflection of 20° from the neutral position. In other embodiments, the second portion 502 can have other maximum upward deflections.

Figure 7A:
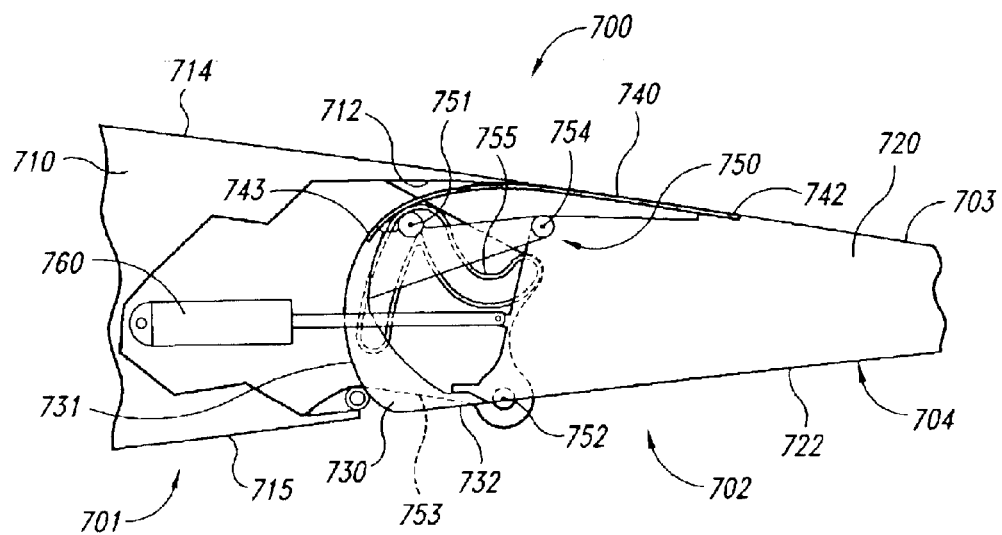
FIGS. 7A–7B are partially schematic, cross-sectional side views of an airfoil having a movable aft portion in accordance with yet another embodiment of the invention.

In still further embodiments, the airfoils can have other arrangements that also include smooth surfaced, gapped deployable trailing edge devices. For example, as shown in FIG. 7A, an airfoil 700 can include a first portion 701 coupled to a second portion 702 with a guide structure 750 in accordance with yet another embodiment of the invention. In one aspect of this embodiment, the first portion 701 can include a wing body 710 having an upper surface 714, a lower surface 715, a first trailing edge 712, and a hinge support 753 that extends aft from the first trailing edge 712. The second portion 702 can include a trailing edge body 720 (a portion of which is visible in FIG. 7A) coupled at a lower pivot joint 752 to the hinge support 753. The second portion 702 can further include a leading edge body 730 coupled to the trailing edge body 720 at an upper pivot joint 754, and coupled to the hinge support 753 with a roller 751. The roller 751 can be received in a guide slot 755 of the hinge support 753. An actuator 760 can be coupled to the second portion 702 to move the second portion 702 relative to the first portion 701. The motion of the second portion 702 relative to the first portion 701 is controlled in part by the path the roller 751 takes as it travels in the guide slot 755.

The airfoil 700 further includes a flexible flow surface 740 connected to the trailing edge body 720 at an aft attachment point 742, and attached to the leading edge body 530 at a forward attachment point 743. The trailing edge body 720 has an upper surface 703 and a lower surface 704 that defines an aft segment 722. The leading edge body 730 has a second leading edge 731 that defines a forward segment 732. The forward segment 732 forms a continuous contour with the aft segment 722 when the second portion 702 is in the neutral position (as shown in FIG. 7A), and breaks with the aft segment 722 when the second portion 702 is deflected, as described in greater detail below with reference to FIG. 7B.

Figure 7B:
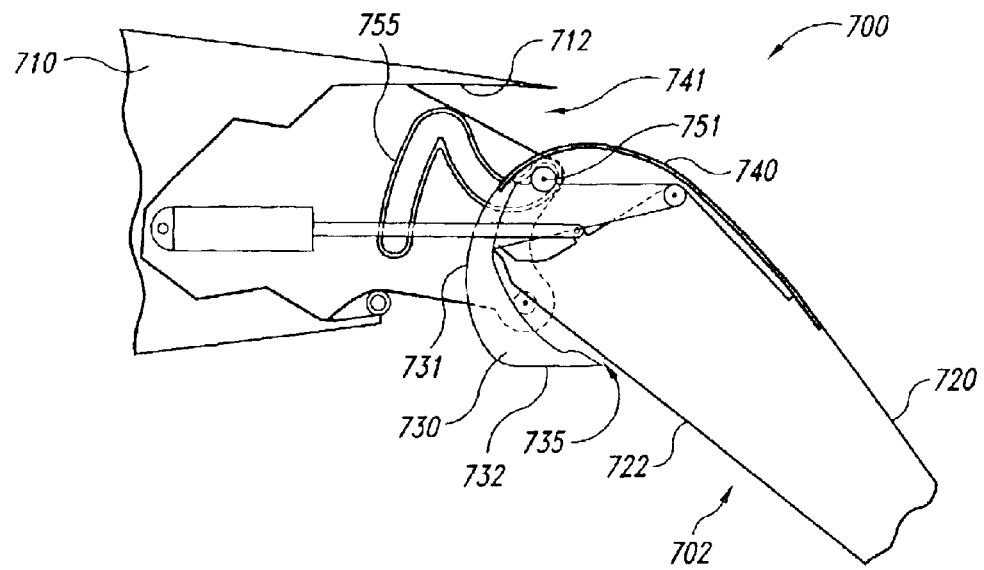

FIG. 7B illustrates the airfoil 700 with the second portion 702 deflected downwardly 45° from the neutral position to form a gap 741 between the first trailing edge 712 of the wing body 710, and the second leading edge 731 of the leading edge body 730. As the second portion 702 deflects downwardly, the flexible flow surface 740 changes shape to maintain a smooth, continuous flow surface between the leading edge body 730 and the trailing edge body 720. At the same time, a space 735 opens between the aft segment 722 and the forward segment 732. The second portion 702 can be deflected downwardly by other angles greater or less than 450, and can also be deflected upwardly relative to the neutral position, as described above.

From the foregoing, it will be appreciated that specific embodiments of the invention have been described herein for purposes of illustration, but that various modifications may be made without deviating from the spirit and scope of the invention. For example, the second or movable portions 102 described above can be implemented on airfoils other than wings and aft-mounted horizontal stabilizers, for example, on canards or any other lift-generating surface. The guide structure that couples the second portions 102 to the first portions 101 can include arrangements other than the four-bar linkage arrangements shown in the figures. For example, the guide structures can include six-bar or other multiple linkage arrangements. Accordingly, the invention is not limited except as by the appended claims.

We claim:

1. An airfoil assembly, comprising:
a first portion having a first leading edge, a first flow surface, a second flow surface facing opposite from the first flow surface, and a hinge support;
a second portion having a trailing edge body, a leading edge body, a second leading edge and a trailing edge, at least part of the second leading edge being positioned aft of the first leading edge, the second portion being movable relative to the first portion between a first position and a second position, wherein the second leading edge is separated from at least part of the first portion by an airflow gap when the second portion is in the second position, and wherein the second portion includes a flexible flow surface adjacent to the airflow gap and connected to the leading edge body, the flexible flow surface having a first shape when the second portion is in the first position, the flexible flow surface having a second shape different than the first shape when the second portion is in the second position; and
a guide structure including a first pivot joint between the trailing edge body and the hinge support, a second pivot joint between the trailing edge body and the leading edge body, and a coupling link pivotably coupled between the hinge support and the leading edge body, wherein at least one pivot joint of the guide structure is coupled between the first portion and the second portion, and located at least approximately at or within a flow contour of the first and second portions.

2. The airfoil of claim 1 wherein the guide structure includes a four-bar linkage arrangement.

3. The airfoil of claim 1 wherein the guide structure includes a roller and slot arrangement.

4. The airfoil of claim 1 wherein the second portion includes a third surface facing opposite from the flexible flow surface, and wherein the first, second, third and flexible flow surfaces define a flow contour.

5. The airfoil of claim 1 wherein the guide structure includes a first pivot joint between the first portion and the second portion, and wherein the guide structure further includes a coupling link pivotably coupled between the first portion and the second portion at second and third pivot joints.

6. The airfoil of claim 1 wherein the second portion includes a leading edge body attached to the flexible flow surface, and wherein the guide structure includes a pivot joint between the first portion and the second portion, and wherein the guide structure further includes a coupling link pivotably coupled between the first portion and the leading edge body.

7. The airfoil of claim 1 wherein the second portion deflects downwardly relative to the first portion when the second portion is in the second position.

8. The airfoil of claim 1 wherein the second portion deflects downwardly relative to the first portion when the second portion is in the second position, and wherein the second portion is movable to a third position with the second portion deflected upwardly relative to the first portion.

9. The airfoil of claim 1 wherein the second portion at least partially seals the gap when the second portion is in the first position.

10. The airfoil of claim 1 wherein the flexible flow surface forms a generally continuous first contour with the first surface of the first portion when the second portion is in the first position, and wherein the second portion further includes a third surface facing opposite from the flexible flow surface, the third surface forming a generally continuous second contour with the second surface of the first portion when the second portion is in the second position, further wherein the third surface has a forward section and an aft section, the forward and aft sections forming a generally continuous third contour when the second portion is in the first position, the forward and aft sections being spaced apart from each other when the second portion is in the second position.

11. The airfoil of claim 1, further comprising an actuator coupled between the first portion and the second portion, the actuator being positioned to selectively move the second portion between the first and second positions.

12. The airfoil of claim 1 wherein the second portion is configured to operate as at least one of a flap, an aileron, an elevator, a speed brake, and a spoiler.

13. The airfoil of claim 1 wherein the first portion includes a primary lifting surface for an aircraft.

14. An airfoil, comprising:
a first portion having a first leading edge, a first flow surface and a second flow surface facing opposite from the first flow surface, and
a plurality of second portions positioned aft the first leading edge, each second portion having a second leading edge positioned aft of the first leading edge, each second portion further having a trailing edge and being movable relative to the first portion between a firstr position and a second position, wherein the second leading edge of each second portion is separated from the first portion of the airfoil by a gap when the second portion is in the second position, and wherein each second portion includes a flexible flow surface, each flexible flow surface having a first shape when a corresponding one of the second portions is in the first position, each flexible flow surface having a second shape different than the first shape when the corresponding second portion is in the second position; and
a plurality of guide structures, with each guide structure having at least one pivot joint between the first portion and a corresponding one of the second portions, and located at least approximately at or with a flow contour of the first portion and the corresponding one of the second portions, wherein at least one of the plurality of guide structures includes a four-bar linkage arrangement.

15. The airfoil of claim 14 wherein each of the second portions is movable relative to the first portion independently of the other second portions.

16. The airfoil of claim 14 wherein at least one of the plurality of guide structures includes a roller and slot arrangement.

17. The airfoil of claim 14 wherein at least one of the plurality of guide structures includes a first pivot joint between the first portion and a corresponding one of the second portions, and wherein the at least one guide structure further includes a coupling link pivotably coupled between the first portion and the corresponding second portion at second and third pivot joints.

18. The airfoil of claim 14 wherein the first portion includes at least one hinge support, and wherein at least one of the second portions includes a trailing edge body and a leading edge body, the leading edge body being connected to one of the flexible flow surfaces, wherein at least one of the guide structures includes a first pivot joint between the trailing edge body and the leading edge body, and a coupling link pivotably coupled between the at least one hinge support and the leading edge body.

19. The airfoil of claim 14 wherein at least one of the second portions deflects downwardly relative to the first portion when the at least one second portion is in the second position.

20. The airfoil of claim 14 wherein at least one of the second portions deflects downwardly relative to the first portion when the second portion is in the second position, and wherein the at least one second portion is movable to a third position with the at least one second portion deflected upwardly relative to the first portion.

21. The airfoil of claim 14 wherein at least one of the second portions at least partially seals the gap when the at least one second portion is in the first position.

22. The airfoil of claim 14, further comprising an actuator coupled between the first portion and at least one of the second portions, the actuator being positioned to selectively move the at least one second portion between the first and second portions.

23. The airfoil of claim 1 wherein the flexible flow surface is positioned to seal against the first portion when the second portion is in the first position.

24. The airfoil of claim 1 wherein the second portion pivots relative to the first portion about an axis that passes through the pivot through the pivot joint and is fixed relative to the first and second portions.

25. An airfoil assembly, comprising:
a first portion having a first leading edge, a first flow surface and a second flow surface facing opposite from the first flow surface;
a second portion having a second leading edge and a trailing edge, at least part of the second leading edge being positioned aft of the first leading edge, the second portion being movable relative to the first portion between a first position and a second position, wherein the second leading edge is separated from at least part of the first portion by an airflow gap when the second portion is in the second position, and wherein the second portion includes a flexible flow surface adjacent to the airflow gap, the flexible flow surface having a first shape when the second portion is in the first position, the flexible flow surface having a second shape different than the first shape when the second portion is in the second position; and
a guide structure including at least one pivot joint coupled between the first portion and the second portion, and located at least approximately at or within a flow contour of the first and second portions, wherein the guide structure includes a four-bar linkage arrangement.

26. An airfoil assembly, comprising:
a first portion having a first leading edge, a first flow surface and a second flow surface facing opposite from the first flow surface;
a second portion having a second leading edge and a trailing edge, at least part of the second leading edge being positioned aft of the first leading edge, the second portion being movable relative to the first portion between a first position and a second position, wherein the second leading edge is separated from at least part of the first portion by an airflow gap when the second portion is in the second position, and wherein the second portion includes a flexible flow surface adjacent to the airflow gap, the flexible flow surface having a first shape when the second portion is in the first position, the flexible flow surface having a second shape different than the first shape when the second portion is in the second position; and
a guide structure including at least one pivot joint coupled between the first portion and the second portion, and located at least approximately at or within a flow contour of the first and second portions, wherein the guide structure includes a roller and slot arrangement.

27. An airfoil, comprising:

a first portion having a first leading edge, a first flow surface and a second flow surface facing opposite from the first flow surface; and a plurality of second portions positioned aft the first leading edge, each second portion having a second leading edge positioned aft of the first leading edge, each second portion further having a trailing edge and being movable relative to the first portion between a first position and a second position, wherein the second leading edge of each second portion is separated from the first portion of the airfoil by a gap when the second portion is in the position, and wherein each second portion includes a flexible flow surface, each flexible flow surface having a first shape when a corresponding one of the second portions is in the first position, each flexible flow surface having a second shape different than the first shape when the corresponding second portion is in the second position; and a plurality of guide structures, with each guide structure having at least one pivot joint between the first portion and a corresponding one of the second portions, and located at least approximately at or with a flow contour of the first portion and the corresponding one of the second portions, wherein at least one of the plurality of guide structures includes a roller and slot arrangement.

28. An airfoil, comprising:

a first portion having a first leading edge, a first flow surface and a second flow surface facing opposite form the first flow surface; and a plurality of second portions positioned aft the first leading edge, each second portion having a second leading edge positioned aft of the first leading edge, each second portion further having a trailing edge and being movable relative to the first portion between a first position and a second position, wherein the second leading edge of each second portion is separated from the first portion of the airfoil by a gap when the second portion is in the second position, and wherein each second portion includes a flexible flow surface, each flexible flow surface having a first shape when a corresponding one of the seconds portion is in the first position, each flexible flow surface having a second shape different than the first shape when the corresponding second portion is in the second position; and a plurality of guide structures, with each guide structure having at least one pivot joint between the first portion and a corresponding one of the second portions, and located at least approximately at or with a flow contour of the first portion and the corresponding one of the second portions, wherein at least one of the plurality of guide structures includes a first pivot joint between the first portion and a corresponding one of the second portions, and wherein the at least one guide structure further includes a coupling link pivotably coupled between the first portion and the corresponding second portion at second and third pivot joints.

* * * * *

UNITED STATES PATENT AND TRADEMARK OFFICE
CERTIFICATE OF CORRECTION

PATENT NO. : 7,258,308 B2  Page 1 of 8
APPLICATION NO. : 10/188988
DATED : August 21, 2007
INVENTOR(S) : Beyer et al.

It is certified that error appears in the above-identified patent and that said Letters Patent is hereby corrected as shown below:

References Cited, U.S. PATENT DOCUMENTS should include:

| Patent No. | | Date | Inventor |
|---|---|---|---|
| 1,770,575 | | 7/1930 | Ksoll |
| 2,086,085 | | 7/1937 | Lachmann et al. |
| 2,282,516 | | 5/1942 | Hans et al. |
| 2,289,704 | | 7/1942 | Grant |
| 2,319,383 | | 5/1943 | Zap |
| 2,383,102 | | 8/1945 | Zap |
| 2,385,351 | | 9/1945 | Davidsen |
| 2,387,492 | | 10/1945 | Blaylock et al. |
| 2,389,274 | | 11/1945 | Pearsall et al. |
| 2,422,296 | | 6/1947 | Flader et al. |
| 2,458,900 | | 1/1949 | Erny |
| 2,563,453 | | 8/1951 | Briend |
| 2,652,812 | | 9/1953 | Fenzl |
| 2,665,084 | | 1/1954 | Feeney et al. |
| 2,864,239 | | 12/1958 | Taylor |
| 2,877,968 | | 3/1959 | Granan et al. |
| 2,891,740 | | 6/1959 | Campbell |
| 2,892,312 | | 6/1959 | Allen et al. |
| 2,899,152 | | 8/1959 | Weiland |
| 2,938,680 | | 5/1960 | Greene et al. |
| 2,990,144 | | 6/1961 | Hougland |
| 2,990,145 | | 6/1961 | Hougland |
| 3,013,748 | | 12/1961 | Westburg |
| 3,089,666 | | 5/1963 | Quenzler |
| 3,102,607 | | 9/1963 | Roberts |
| 3,136,504 | | 6/1964 | Carr |
| 3,203,647 | * | 8/1965 | Alvarez-Calderon |
| 3,447,763 | | 6/1969 | Allcock |
| 3,528,632 | | 9/1970 | Miles et al. |
| 3,653,611 | | 4/1972 | Trupp et al. |
| 3,677,504 | | 7/1972 | Schwarzler |
| 3,704,828 | | 12/1972 | Studer et al. |
| 3,704,843 | | 12/1972 | Jenny |
| 3,767,140 | | 10/1973 | Johnson |
| 3,794,276 | | 2/1974 | Maltby et al. |
| 3,827,658 | | 8/1974 | Hallworth |

UNITED STATES PATENT AND TRADEMARK OFFICE
CERTIFICATE OF CORRECTION

PATENT NO. : 7,258,308 B2
APPLICATION NO. : 10/188988
DATED : August 21, 2007
INVENTOR(S) : Beyer et al.

It is certified that error appears in the above-identified patent and that said Letters Patent is hereby corrected as shown below:

References Cited, U.S. PATENT DOCUMENTS should include:

| | | |
|---|---|---|
| 3,831,886 | 8/1974 | Burdges et al. |
| 3,836,099 | 9/1974 | O'Neill et al. |
| 3,862,730 | 1/1975 | Heiney |
| 3,941,341 | 3/1976 | Brogdon, Jr. |
| 3,949,957 | 4/1976 | Portier et al. |
| 3,968,946 | 7/1976 | Cole |
| 3,987,983 | 10/1976 | Cole |
| 3,992,979 | 11/1976 | Smith |
| 4,117,996 | 10/1978 | Sherman |
| 4,120,470 | 10/1978 | Whitener |
| 4,146,200 | 3/1979 | Borzachillo |
| 4,189,122 | 2/1980 | Miller |
| 4,200,253 | 4/1980 | Rowarth |
| 4,240,255 | 12/1980 | Benilan |
| 4,275,942 | 6/1981 | Steidl |
| 4,283,029 | 8/1981 | Rudolph |
| 4,285,482 | 8/1981 | Lewis |
| 4,353,517 | 10/1982 | Rudolph |
| 4,368,937 | 1/1983 | Palombo et al. |
| 4,384,693 | 5/1983 | Pauly |
| 4,441,675 | 4/1984 | Boehringer |
| 4,461,449 | 7/1984 | Turner |
| 4,485,992 | 12/1984 | Rao |
| 4,496,121 | 1/1985 | Berlin |
| 4,498,646 | 2/1985 | Proksch |
| 4,533,096 | 8/1985 | Baker |
| 4,576,347 | 3/1986 | Opsahl |
| 4,637,573 | 1/1987 | Perin |
| 4,700,911 | 10/1987 | Zimmer |
| 4,702,441 | 10/1987 | Wang |
| 4,717,097 | 1/1988 | Sepstrup |
| 4,729,528 | 3/1988 | Borzachillo |
| 4,784,355 | 11/1988 | Brine |
| 4,786,013 | 11/1988 | Pohl |
| 4,856,735 | 8/1989 | Lotz |
| 4,892,274 | 1/1990 | Pohl et al. |

UNITED STATES PATENT AND TRADEMARK OFFICE
CERTIFICATE OF CORRECTION

PATENT NO. : 7,258,308 B2
APPLICATION NO. : 10/188988
DATED : August 21, 2007
INVENTOR(S) : Beyer et al.

It is certified that error appears in the above-identified patent and that said Letters Patent is hereby corrected as shown below:

References Cited, U.S. PATENT DOCUMENTS should include:

| | | |
|---|---|---|
| 4,899,284 | 1/2001 | Lewis |
| 5,039,032 | 8/1991 | Rudolph |
| 5,046,688 | 9/1991 | Woods |
| 5,074,495 | 12/1991 | Raymond |
| 5,082,207 | 1/1992 | Tulinius |
| 5,082,208 | 1/1992 | Matich |
| 5,088,665 | 2/1992 | Vijgen |
| 5,094,412 | 3/1992 | Narramore |
| 5,100,082 | 3/1992 | Archung |
| 5,114,100 | 5/1992 | Rudolph |
| 5,129,597 | 7/1992 | Manthey |
| 5,167,383 | 12/1992 | Nozaki |
| 5,203,619 | 4/1993 | Welsch |
| 5,207,400 | 5/1993 | Jennings |
| 5,244,269 | 9/1993 | Harriehausen |
| 5,259,293 | 11/1993 | Brunner |
| 5,351,914 | 10/1994 | Nagao |
| 5,388,788 | 2/1995 | Rudolph |
| 5,420,582 | 5/1995 | Kubbat |
| 5,441,218 | 8/1995 | Mueller |
| 5,493,497 | 2/1996 | Buus |
| 5,535,852 | 7/1996 | Bishop |
| 5,544,847 | 8/1996 | Bliesner |
| 5,600,220 | 2/1997 | Thoraval |
| 5,609,020 | 3/1997 | Jackson |
| 5,680,124 | 10/1997 | Bedell |
| 5,681,014 | 10/1997 | Palmer |
| 5,686,907 | 11/1997 | Bedell |
| 5,735,485 | 4/1998 | Ciprian et al. |
| 5,743,490 | 4/1998 | Gillingham |
| 5,788,190 | 8/1998 | Siers |
| 5,839,698 | 11/1998 | Moppert |
| 5,875,998 | 1/2001 | Gleine |
| 5,921,506 | 7/1999 | Appa |
| 5,927,656 | 7/1999 | Hinkleman |

UNITED STATES PATENT AND TRADEMARK OFFICE
CERTIFICATE OF CORRECTION

PATENT NO. : 7,258,308 B2
APPLICATION NO. : 10/188988
DATED : August 21, 2007
INVENTOR(S) : Beyer et al.

It is certified that error appears in the above-identified patent and that said Letters Patent is hereby corrected as shown below:

References Cited, U.S. PATENT DOCUMENTS should include:

| | | | |
|---|---|---|---|
| 5,934,615 | | 8/1999 | Treichler |
| 5,978,715 | | 11/1999 | Briffe |
| 5,984,230 | | 11/1999 | Drazi |
| 6,015,117 | | 1/2000 | Broadbent |
| 6,045,204 | | 4/2000 | Frazier |
| 6,073,624 | | 6/2000 | Laurent |
| 6,076,767 | | 6/2000 | Farley et al. |
| 6,152,405 | | 11/2000 | Muller et al. |
| 6,161,801 | | 1/2001 | Kelm |
| 6,164,598 | | 12/2000 | Young et al. |
| 6,189,837 | | 2/2001 | Matthews |
| 6,227,498 | | 5/2001 | Arata |
| 6,244,542 | | 6/2001 | Young et al. |
| 6,293,497 | | 9/2001 | Kelley-Wickemeyer et al. |
| 6,349,798 | | 2/2002 | Mckay |
| 6,364,254 | | 4/2002 | May |
| 6,375,126 | | 4/2002 | Sakurai |
| 6,439,512 | | 8/2002 | Hart |
| 6,481,667 | | 11/2002 | Ho |
| 6,484,969 | | 8/2001 | Sprenger |
| 6,499,577 | A1 | 12/2002 | Kitamoto et al. |
| 6,536,714 | A1 | 3/2003 | Gleine et al. |
| 6,547,183 | | 2/2003 | Farnsworth |
| 6,591,169 | | 5/2003 | Jones |
| 6,598,829 | | 10/2002 | Kamstra |
| 6,598,834 | | 1/2002 | Nettle |
| 6,622,972 | A1 | 9/2003 | Urnes |
| 6,622,974 | A1 | 9/2003 | Dockter et al. |
| 6,625,982 | | 9/2002 | Bossche |
| 6,644,599 | | 8/2002 | Perez |
| 6,651,930 | | 11/2003 | Gautier et al. |
| 6,729,583 | | 5/2004 | Milliere et al. |
| 6,745,113 | | 12/2003 | Griffin |
| 6,796,526 | A1 | 9/2004 | Boehringer |
| 6,796,534 | A1 | 9/2004 | Beyer et al. |
| 6,799,739 | | 10/2004 | Jones |

UNITED STATES PATENT AND TRADEMARK OFFICE
CERTIFICATE OF CORRECTION

PATENT NO. : 7,258,308 B2
APPLICATION NO. : 10/188988
DATED : August 21, 2007
INVENTOR(S) : Beyer et al.

It is certified that error appears in the above-identified patent and that said Letters Patent is hereby corrected as shown below:

References Cited, U.S. PATENT DOCUMENTS should include:

| | | |
|---|---|---|
| 6,802,475 A1 | 10/2004 | Davies et al. |
| 10/671,435 | | Kelley-Wickemyer |
| 10/746,883 | | Boorman |
| 10/746,912 | | Boorman |
| 10/770,256 | | Speer |
| 10/787,644 | | Tafs et al. |
| 10/789,100 | | Lacy |
| 10/798,749 | | Sandell et al. |
| 10/814,369 | | Chen et al. |
| 10/814,494 | | Gunn et al. |
| 10/815,034 | | Crane et al. |
| 10/868,234 | | Rampton |
| 10/868,238 | | Dun |
| 10/935,846 | | Good et al. |
| 10/955,686 | | Wheaton et al. |
| 10/959,629 | | Jones |
| 11/048,320 | | Konings |
| 11/051,738 | | Huynh |
| 11/116,905 | | Good et al. |
| 2001/0006207 | 7/2001 | Caton et al. |
| 2002/0046087 | 4/2002 | Hey |
| 2003/0058134 | 3/2003 | Sherry |
| 2003/0132860 | 7/2003 | Feyereisen |
| 2003/0197097 | 10/2003 | Wakayama |
| 2003/0230677 | 12/2003 | Milliere |
| 2004/0059474 | 3/2004 | Boorman |
| 2004/0195464 A1 | 10/2004 | Vassberg et al. |
| 2005/0011994 A1 | 1/2005 | Sakurai et al. |
| 2005/0017126 A1 | 1/2005 | Mclean et al. |
| 2005/0045765 | 3/2005 | Pitt |
| 2005/0242234 | 1/2005 | Mahumlyin |
| 60/475,828 | | Beyer |

UNITED STATES PATENT AND TRADEMARK OFFICE
CERTIFICATE OF CORRECTION

PATENT NO.        : 7,258,308 B2
APPLICATION NO.  : 10/188988
DATED             : August 21, 2007
INVENTOR(S)       : Beyer et al.

It is certified that error appears in the above-identified patent and that said Letters Patent is hereby corrected as shown below:

References Cited, FOREIGN PATENT DOCUMENTS should include:
| | | | | |
|---|---|---|---|---|
| EP | 0 103 038 |    | The Boeing Company | 3/1984 |
| EP | 0 483 504 | A1 | Deutsche Airbus GmbH | 5/1992 |
| EP | 1 010 616 | A2 | Daimler Chrysler AG (DE) | 6/2000 |
| EP | 1 547 917 | A1 | Airbus Deutschland GmbH | 6/2005 |
| GB | 2 144 688 | A  | British Aerospace Public Ltd Company | 3/1985 |

References Cited, OTHER PUBLICATIONS: should include:

"Adaptive Aircraft: No Flight of Fancy?: Research into Using Exotic Means of Making Wings Change Shape In-Flight Looks Promising, Though Still a Long Way From Reality," Business Week On-Line, 1/7/2003, Pages 1-3

"Aero-Space Research & Technology," Space Systems, September 1, 2001, Pages 1-28

777 High Lift System, 777 Maintenance Manual, Publication Date: Circa 1994 (1 page)

777 Transmission - Typical, 777 Maintenance Manual, Publication Date: Circa 1994 (1 page)

A320 Hinterkantem-Klappen-Verstell System, Trailing Edge Flap System, SAE Presentation, Publication Date: Circa 1990 (1 page)

A340 Flight Controls, SAE Presentation, Publication Date: Circa 1995 (1 page)

Boeing, 777 Aircraft Maintenance Manual, September 5, 2002 (page 39)

Drela, M., "Optimization Techniques In Airfoil Design," MIT Aero & Astro, 29 pages Drela, Mark, "Design and Optimization Method for Mutli-Element Airfoils," MIT Department of Aeronautics and Astronautics, Copyright 1993 American Institute of Aeronautics and Astronautics, Inc. (pages 1-11)

UNITED STATES PATENT AND TRADEMARK OFFICE
CERTIFICATE OF CORRECTION

PATENT NO. : 7,258,308 B2
APPLICATION NO. : 10/188988
DATED : August 21, 2007
INVENTOR(S) : Beyer et al.

It is certified that error appears in the above-identified patent and that said Letters Patent is hereby corrected as shown below:

References Cited, OTHER PUBLICATIONS: should include:
    European Search Report for European Patent Application No. EP 03 07 7840, The Boeing Company, November 4, 2003 (2 pgs)

Flap Drive System, 777 Maintenance Manual, Publication Date: Circa 1994 (1 page)

Flap Transmission and Support, 777 Maintenance Manual, Publication Date: Circa 1994 (1 page)

HANSEN, H., "Application of Mini-Trailing-Edge Devices in the Awiator Project," Airbus Deutschland, EGAG, Hunefeldstr. 1-5, D-28199 Bremen, Germany, 9 pages Junkers JU 52/3M (2 pages); http://www.wpafb.af.mil/museum/outdoor/od16 [Accessed 8/7/03]

MOOG, Component Maintenance Manual, May 1994 (2 pages)

Morphing Aircraft Structures, "Morphing Aircraft Structures-Raytheon," <<http://www.defense-update.com/products/m/morphing-structures.htm>>, Pages 1-3, [Accessed 08/31/05]

Morphing Aircraft Structures, "Morphing Aircraft Structures-The Cellular Approach," <http://www.personal.psu.edu/users/d/s/dsr134/mas/Cellular.htm>, Penn State University, pages 1-3 [Accessed 08/31/05]

Morphing Systems, "Morphing Aerostructures-An Overview," <http://www.crgrp.net/morphingsystems.htm>, Pages 1-9, [Accessed 08/31/05]

NIU, Chen-Yen, Airframe Structural Design, Chen-Yeun Niu, Conmilit Press, 1988 (1 page)

PETROV., A.V., "Certain Types of Separated Flow over Slotted Wings," Fluid Mechanics-Soviet Research, Vol. 7, No. 5, September-October 1978; pp 80-89

UNITED STATES PATENT AND TRADEMARK OFFICE
CERTIFICATE OF CORRECTION

PATENT NO.        : 7,258,308 B2
APPLICATION NO.   : 10/188988
DATED             : August 21, 2007
INVENTOR(S)       : Beyer et al.

It is certified that error appears in the above-identified patent and that said Letters Patent is hereby corrected as shown below:

References Cited, OTHER PUBLICATIONS: should include:
  The High Speed Frontier, Chapter 2: The High-Speed Airfoil Program,
  "SUPERCRITICAL" AIRFOILS, 1957-1978 (4 pages);
  http://www.hq.nasa.gov/office/pao/History/SP-445/ch2-5

TU-144 Canard (1 pg) date unknown

Whitcomb, Richard T., "Review of NASA Supercritical Airfoils," National
  Aeornautics and Space Administration, August 1974 (pages 8-18)

Column 5, Line 21: "100" should be --10°--
Column 5, Line 24: "100" should be --10°--
Column 7, Line 53: "450" should be --45°--
Column 8, Line 35: "third surface" should be --third flow surface--
Column 8, Line 37: "a" should be --the--
Column 9, Line 27: "firstr" should be --first--
Column 9, Line 64: "and the leading edge body" should be --and the at least one hinge support, a second pivot joint between the trailing edge body, and the leading edge body--
Column 10, Line 14: "portions" should be --positions--
Column 10, Line 20: delete the repetitive phrase "through the pivot"

Signed and Sealed this

Eighteenth Day of March, 2008

JON W. DUDAS
*Director of the United States Patent and Trademark Office*